United States Patent
Lee et al.

(10) Patent No.: US 8,514,315 B2
(45) Date of Patent: Aug. 20, 2013

(54) METHOD FOR PROCESSING IMAGE DATA IN PORTABLE ELECTRONIC DEVICE, AND PORTABLE ELECTRONIC DEVICE HAVING CAMERA THEREOF

(75) Inventors: Il Yong Lee, Seoul (KR); Sung Hyun Kim, Seoul (KR); Lag Young Kim, Seoul (KR); Yun Pyo Hong, Seoul (KR); Seong Chan Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 655 days.

(21) Appl. No.: 12/621,986

(22) Filed: Nov. 19, 2009

(65) Prior Publication Data

US 2010/0208093 A1 Aug. 19, 2010

(30) Foreign Application Priority Data

Feb. 16, 2009 (KR) .................. 10-2009-0012639

(51) Int. Cl.
*H04N 5/222* (2006.01)
(52) U.S. Cl.
USPC ............. 348/333.11; 348/222.1; 348/229.1; 348/333.01; 348/333.02; 348/333.05; 348/333.12
(58) Field of Classification Search
USPC ............. 348/222.1, 229.1, 333.01–333.02, 348/333.05, 333.11–333.12
See application file for complete search history.

(56) References Cited

U.S. PATENT DOCUMENTS

| | | | |
|---|---|---|---|
| 6,301,440 B1 | 10/2001 | Bolle et al. | |
| 6,344,907 B1 * | 2/2002 | Watanabe et al. | 358/448 |
| 2007/0013957 A1 | 1/2007 | Kim et al. | |
| 2008/0037841 A1 * | 2/2008 | Ogawa | 382/118 |
| 2008/0079822 A1 * | 4/2008 | Nojima | 348/231.99 |
| 2008/0259170 A1 * | 10/2008 | Hatanaka | 348/208.6 |
| 2008/0292181 A1 | 11/2008 | Kasai et al. | |
| 2009/0059054 A1 * | 3/2009 | Oishi et al. | 348/333.11 |
| 2009/0079852 A1 * | 3/2009 | Kojima | 348/241 |

FOREIGN PATENT DOCUMENTS

| | | |
|---|---|---|
| EP | 0 987 885 A2 | 3/2000 |
| EP | 1 322 109 A2 | 6/2003 |
| JP | 2003-274268 A | 9/2003 |
| JP | 2007-228118 A | 9/2007 |

OTHER PUBLICATIONS

Platt, Microsoft Research, "Probabilistic Outputs for Support Vector Machines and Comparisons to Regularize Likelihood Methods," Advances in Large Margin Classifiers, (Mar. 26, 1999), pp. 61-74.

* cited by examiner

*Primary Examiner* — Antoinette Spinks
(74) *Attorney, Agent, or Firm* — Birch, Stewart, Kolasch & Birch, LLP

(57) ABSTRACT

The present disclosure is related to a method for processing image data in the portable electronic device, the method including obtaining an image through an image obtaining unit of the electronic device having a plurality of shot modes; determining each good-to-fit score of the plurality of shot modes for the obtained image; and displaying the each good-to-fit score of the plurality of shot modes for the obtained image along with the obtained image.

17 Claims, 8 Drawing Sheets

FIG. 4

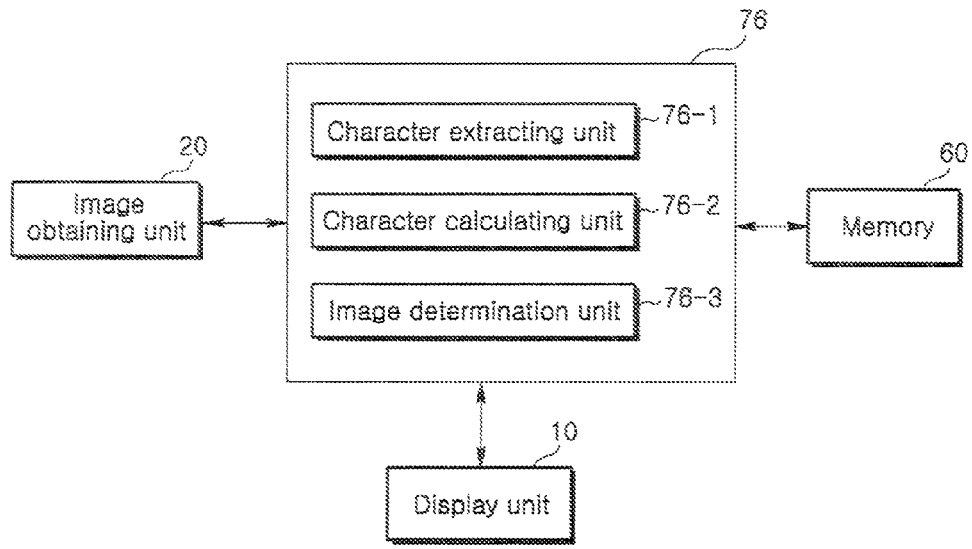

FIG. 5

First mode good-to-fit measuring unit
$$f_1(x) = \sum_{i=1}^{N_{SV1}} \alpha_{1i} y_{1i} K_1(x, x_{SV1i}) + b_1$$

Second mode good-to-fit measuring unit
$$f_2(x) = \sum_{i=1}^{N_{SV2}} \alpha_{2i} y_{2i} K_2(x, x_{SV2i}) + b_2$$

Third mode good-to-fit measuring unit
$$f_3(x) = \sum_{i=1}^{N_{SV3}} \alpha_{3i} y_{3i} K_3(x, x_{SV3i}) + b_3$$

FIG. 6

$$\text{Good-to-fit}_1 = \left(1/\left(1 + e^{\lambda_1 f_1(x) \beta_1}\right) + \gamma_1\right) \times 100$$

$$\text{Good-to-fit}_2 = \left(1/\left(1 + e^{\lambda_2 f_2(x) \beta_2}\right) + \gamma_2\right) \times 100$$

$$\text{Good-to-fit}_3 = \left(1/\left(1 + e^{\lambda_3 f_3(x) \beta_3}\right) + \gamma_3\right) \times 100$$

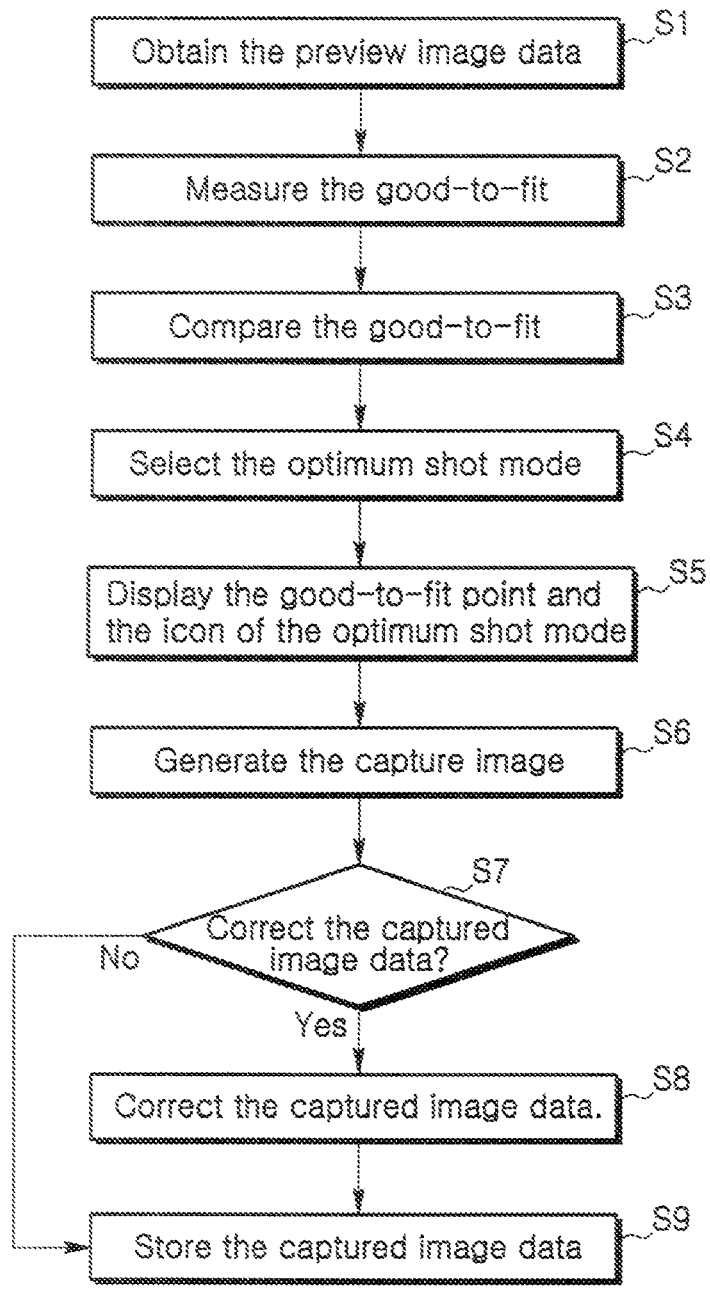

METHOD FOR PROCESSING IMAGE DATA IN PORTABLE ELECTRONIC DEVICE, AND PORTABLE ELECTRONIC DEVICE HAVING CAMERA THEREOF

This application claims the benefit of the Korean Patent Application No. 10-2009-0012639, filed on Feb. 16, 2009, which is hereby incorporated by reference as if fully set forth herein.

BACKGROUND OF THE DISCLOSURE

1. Field of the Disclosure

The present disclosure relates to a method for processing image data and a portable electronic device having camera thereof.

2. Discussion of the Related Art

Portable electronic devices have come to be one of the necessities of life for modern people. Types of the portable electronic devices may include a mobile terminal such as a cell phone, a digital camera, a portable multimedia player (PMP), a laptop computer, and an MP3 player. The portable electronic devices have evolved into multi-function devices as technology developed. As functions of the portable electronic devices have diversified, one implementation of the portable electronic devices is as a multimedia player provided with a multitude of functions such as photographing of still pictures or moving pictures, playback of music or moving picture files, support of game play, broadcast reception and the like, for example.

To support the increase in the functions the portable electronic devices, improvements of structural parts and/or software parts of the portable electronic devices may be considered.

A digital camera may be installed in the portable electronic devices. The digital camera may comprise a lens configured to form an optical image of a subject to be photographed, a CCD (charge coupled device) sensor (or, CMOS sensor) configured to convert an optical signal to an electronic image signal, and an image processing unit configured to process an image signal. Recently, a zoom function, a macro function, a night shot function and other functions have been adopted by the digital camera.

SUMMARY OF THE DISCLOSURE

Accordingly, an object of the present disclosure is to provide a method for processing image data in a portable electronic device, the method including obtaining an image through an image obtaining unit of the electronic device having a plurality of shot modes; determining each good-to-fit score of the plurality of shot modes for the obtained image; and displaying the each good-to-fit score of the plurality of shot modes for the obtained image along with the obtained image.

Another object of the present disclosure is to provide a portable electronic device including an image obtaining unit which obtains an image data of an image; a display unit which displays the obtained image; and a controller which controls determining of each good-to-fit score of the plurality of the shot modes for the obtained image, and displaying of the good-to-fit score of the plurality of the shot modes for the obtained image along with the obtained image.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 4 is a detailed block diagram of an image quality evaluation unit, according to one embodiment of the present disclosure.

FIG. 5 shows an equation for obtaining good-to-fit for each shot mode on the image data, according to one embodiment of the present disclosure.

FIG. 6 shows an equation for obtaining a normalized point on the good-to-fit for each shot mode on the image data, according to one embodiment of the present disclosure.

FIG. 7 is a flow chart of a method for processing image data, according to one embodiment of the present disclosure.

DETAILED DESCRIPTION OF THE DISCLOSURE

Reference will now be made in detail to embodiments of the present disclosure, examples of which are illustrated in the accompanying drawings. Wherever possible, the same reference numbers will be used throughout the drawings to refer to the same or like parts. The suffixes 'module' and 'unit' for the elements used in the following description are given or used in common by considering facilitation in writing this disclosure only but fail to have meanings or roles discriminated from each other.

First of all, portable electronic devices described in this disclosure may include a mobile phone, a smart phone, a laptop computer, a digital broadcast terminal, a PDA (personal digital assistant), a PMP (portable multimedia player), a navigation system and the like.

Except for a case applicable to a portable electronic device only, it is apparent to those skilled in the art that the configurations according to an embodiment described in this disclosure is applicable to such a stationary terminal as a digital TV, a desktop computer and the like.

Figure 1:
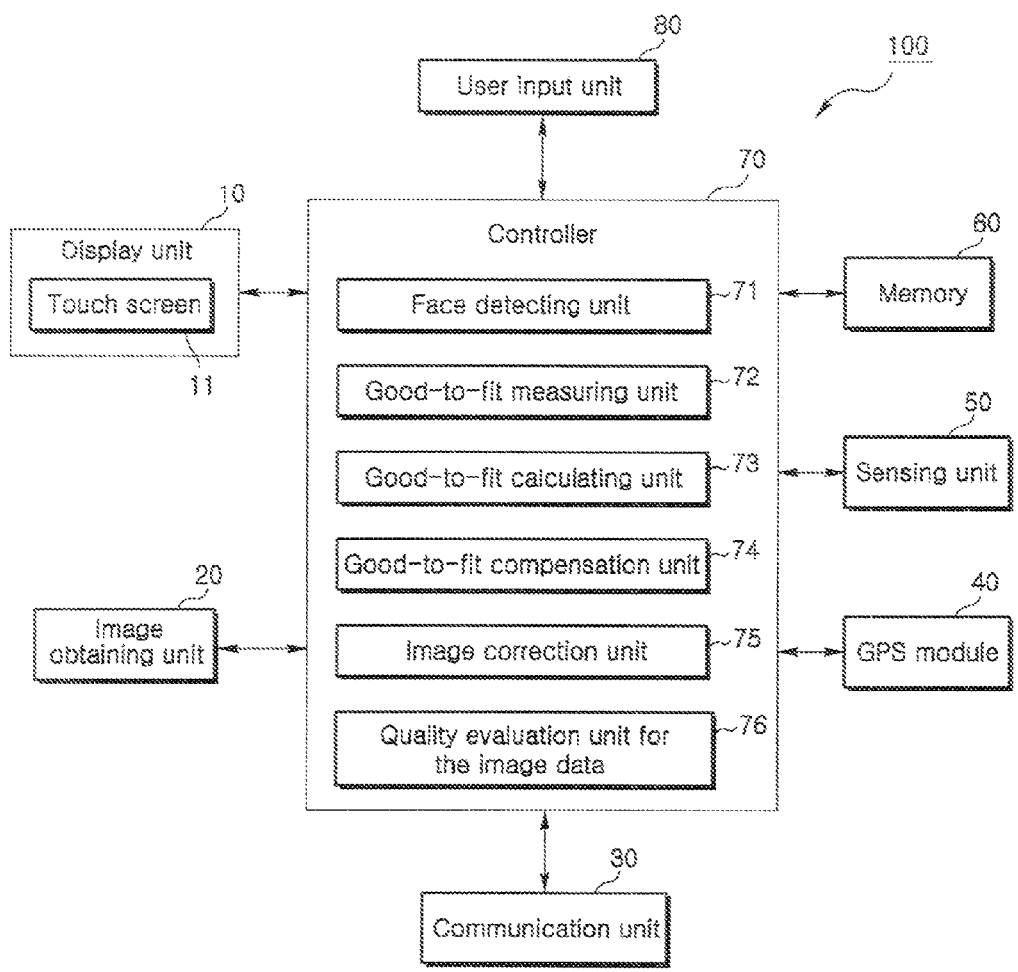
FIG. 1 is a block diagram of a portable electronic device according to one embodiment of the present disclosure.

FIG. 1 is a block diagram of a portable electronic device according to one embodiment of the present disclosure.

Referring to FIG. 1, a portable electronic device 100 according to one embodiment of the present disclosure includes a display unit 10, an image obtaining unit 20, a communication unit 30, a GPS module 40, a sensing unit 50, a memory 60, a controller 70 and a user input unit 80. The display unit 10 may include a touch screen 11. The sensing unit 50 may include an accelerating sensor and a gyro sensor for sensing movement of the portable electronic device 100. The controller 70 may include a face detecting unit 71 configured to detect a face of a human, an object and/or a scene, a good-to-fit measuring unit 72 for measuring a good-to-fit score on an image data for each shot mode, for a plurality of shot modes, a good-to-fit calculating unit 73 for calculating a good-to-fit score on the image data for each shot mode, for a plurality of shot modes, a good-to-fit compensation unit 74, an image correction unit 75, a quality evaluation unit 76 for the image data. The sensing unit 50 is a device for detecting movement of the portable electronic device 100. The sensing unit 50 may include a gyro sensor and an acceleration sensor for detecting the movement. In the following description, aforementioned element will be explained in sequence.

The display unit 10 is typically implemented to visually display (output) information associated with the portable electronic device 100. For instance, if the portable electronic device 100 is a cell phone, the display unit 10 will generally provide a user interface (UI) or a graphical user interface (GUI) which includes information associated with placing, conducting, and terminating a phone call. As another example, if the portable electronic device 100 is in a video call mode or a photographing mode, the display unit 10 may additionally or alternatively display images which are associated with these modes, the UI or the GUI.

The display unit 10 may be implemented using known display technologies including, for example, a liquid crystal display (LCD), a thin film transistor-liquid crystal display (TFT-LCD), an organic light-emitting diode display (OLED), a flexible display and a three-dimensional (3-D) display. The portable electronic device 100 may include one or more of such displays.

Some of the above displays can be implemented in a transparent or optical transmittive type, which can be named a transparent display. As one example for the transparent display, there is a TOLED (transparent OLED) or the like. A rear configuration of the display unit 10 can be implemented in the optical transmittive type as well. In this configuration, a user is able to see an object in a rear of a terminal body via an area occupied by the display unit 10 of the terminal body.

At least two displays can be provided to the portable electronic device 100 in accordance with implemented configurations of the portable electronic device 100. For instance, a plurality of displays can be arranged on a single face of the portable electronic device 100 by being spaced apart from each other or by being built in one body. Alternatively, a plurality of displays can be arranged on different faces of the portable electronic device 100.

In the present disclosure, an image data and a good-to-fit score on the image data for each shot mode of a plurality of shot modes may be displayed on the display unit 10. The detailed description on that will be followed.

In a case that the display unit 10 and a sensor for detecting a touch action (hereinafter called 'touch sensor') configures a mutual layer structure (hereinafter called 'touch screen'), it is able to use the display unit 10 as an input device as well as an output device. In this case, the touch sensor can be configured as a touch film, a touch sheet, a touchpad or the like.

The touch screen 11 can be configured to convert a pressure applied to a specific portion of the display unit 10 or a variation of a capacitance generated from a specific portion of the display unit 10 to an electric input signal. Moreover, a touch sensor may be configured to detect a pressure of a touch as well as a touched position or size. Alternatively, a separate pressure sensor may be applied to detect a pressure of the touch.

If a touch input is given to the touch sensor, signal(s) corresponding to the touch is (are) transferred to a touch controller. The touch controller processes the signal(s) and then transfers the processed signal(s) to the controller 70. Therefore, the controller 70 is able to determine whether a prescribed portion of the display unit 10 is touched.

The image obtaining unit 20 is a device for receiving a video signal. The image obtaining unit 20 may include a camera and so on. The camera processes an image frame such as a still image and a moving image obtained from a image data sensor in a video call mode or a photograph mode. The processed image frame may be displayed on the display unit 10. The image obtaining unit 20 may includes a lens, a image capture unit, and an image signal processor.

The lens may include a zoom lens for enlarging and reducing a size of a subject, a focus lens for matching the focus on the subject, and an iris for adjusting a quantity of the light. An optical signal is received from the lens. The image capture unit converts the optical signal to the electronic signal. The image signal processor processes to convert the electronic signal from the image capture unit to the digital signal. The structure of the image obtaining unit 20 is well known to a person of ordinary skill in the art. Accordingly, a detailed description is omitted for briefness. On the other hand, the image frame processed in the image obtaining unit 20 may be stored in the memory 60 or be transmitted to the external device through communication unit 30. Two camera may be installed according an usage environment.

The communication unit 30 typically includes one or more components which permit communication between the portable electronic device 100 and a wireless communication system or network within which the portable electronic device 100 is located. For instance, the communication unit 30 may include a broadcast receiving module, a mobile communication module, a wireless internet module, a short-range communication module, an interface unit and the like.

The broadcast receiving module receives a broadcast signal and/or broadcast associated information from an external broadcast managing server via a broadcast channel.

The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or a radio broadcast signal. The broadcast receiving module may be configured to receive broadcast signals transmitted from various types of broadcast systems. Non-limiting examples of such broadcasting systems include digital multimedia broadcasting-terrestrial (DMB-T), digital multimedia broadcasting-satellite (DMB-S), digital video broadcast-handheld (DVB-H), the data broadcasting system known as media forward link only) (MediaFLO®) and integrated services digital broadcast-terrestrial (ISDB-T). Optionally, the broadcast receiving module can be configured suitably for other broadcasting systems, as well as the above-explained digital broadcasting systems.

The broadcast signal and/or broadcast associated information received by the broadcast receiving module may be stored in a suitable device, such as a memory 60.

The mobile communication module transmits/receives wireless signals to/from one or more network entities (e.g., base station, external terminal, server, etc.). Such wireless signals may represent audio, video, and data signals according to text/multimedia message transceivings, among others.

The wireless internet module supports Internet access for the portable electronic device 100. This module may be internally or externally coupled to the portable electronic device 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module facilitates relatively short-range communications. Suitable technologies for implementing this module include radio frequency identification (RFID), infrared data association (IrDA), ultra-wideband (UWB), as well as the networking technologies commonly referred to as Bluetooth and ZigBee, to name a few.

The interface unit is often implemented to couple the portable electronic device 100 with external devices. The interface unit receives data from the external devices or is supplied with the power and then transfers the data or power to respective elements of the portable electronic device 100 or enables data within the portable electronic device 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

When the portable electronic device 100 is connected to an external cradle, the interface unit becomes a passage for supplying the portable electronic device 100 with a power from the cradle or a passage for delivering various command signals inputted from the cradle by a user to the portable electronic device 100. Each of the various command signals inputted from the cradle or the power can operate as a signal enabling the portable electronic device 100 to recognize if it is correctly loaded in the cradle.

The GPS module of the portable electronic device 100 by using map data stored in the memory 60. The structure and the operation of the GPS module 40 are known to the person of ordinary skill in the art. The detailed explanation of the GPS module is omitted for briefness.

The sensing unit 50 provides sensing signals for controlling operations of the portable electronic device 100 using status measurements of various aspects of the portable electronic device. For instance, the sensing unit 50 may detect an open/close status of the portable electronic device 100, relative positioning of components (e.g., a display and keypad) of the portable electronic device 100, a position change of the portable electronic device 100 or a component of the portable electronic device 100, a presence or absence of user contact with the portable electronic device 100, orientation or acceleration/deceleration of the portable electronic device 100. As an example, consider the portable electronic device 100 being configured as a slide-type portable electronic device. In this configuration, the sensing unit 50 may sense whether a sliding portion of the portable electronic device is open or closed. Other examples include the sensing unit 50 sensing the presence or absence of power provided by the power supply, the presence or absence of a coupling or other connection between the interface unit and an external device. And, the sensing unit 50 can include a gyro sensor, an acceleration sensor, a pressure sensor, an optical sensor, and proximity sensor, a touch sensor, and/or an illumination sensor.

The memory 60 is generally used to store programs for operating the controller 70. The memory 60 may temporally store a received data such as a preview image, a still image, and a moving image and so on. The memory 60 may be implemented using any type or combination of suitable volatile and non-volatile memories or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the portable electronic device 100 is able to operate in association with a web storage for performing a storage function of the memory 60 on the Internet. In one embodiment of the present disclosure, the memory 60 stores an image data processing program having the plurality of shot modes. The plurality of shot modes may include a scene mode such as a night shot mode, a landscape mode, a figure mode, a café mode, a counterlight mode, a firework mode, and a white balance mode such as sunlight mode, a glow lamp mode, and a fluorescent mode, as well as others. In embodiments of the present invention, the various shot modes may be of the image obtaining unit 20.

The controller 70 typically controls the overall operations of the portable electronic device 100. For example, the controller 70 performs the control and processing associated with voice calls, data communications, video calls, image data etc. The controller 70 of the present disclosure may include a face detecting unit 71 configured to detect a face of human, a good-to-fit measuring unit 72 (for example, SVM (supporting vector machine)) for measuring a good-to-fit score of an image data for each shot mode, a good-to-fit calculating unit 73 for calculating the good-to-fit score of the image data for each shot mode, a good-to-fit compensation unit 74, an image correction unit 75, and a quality evaluation unit 76 for the image data. The face detecting unit 71 configured to detect a face of human, the good-to-fit measuring unit 72 (for example, SVM (supporting vector machine)) for measuring the good-to-fit score of the image data for each shot mode, and the good-to-fit calculating unit 73 for calculating the good-to-fit score of the image data for each shot mode may be installed in the controller 70 or installed outside the controller 70. In embodiments of the present invention, the each shot mode may be one among a plurality of shot modes.

The face detecting unit 71 may use AdaBoast (trade name) and Cascade (tradename) for quick confirmation of the human face in the image data.

Moreover, the controller 70 is able to perform a pattern recognizing process for recognizing a writing input or a picture drawing input carried out on the touch screen as characters or images, respectively.

The user input unit 80 generates input data responsive to user manipulation of an associated input device or devices.

Examples of such devices include a keypad, a dome switch, a touchpad (e.g., static pressure/capacitance), a jog wheel, a jog switch, etc.

Various embodiments described herein may be implemented in a computer-readable medium using, for example, computer software, hardware, or some combinations thereof.

For hardware implementation, the embodiments described herein may be implemented using one or more applications of specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may be also be implemented by the controller 70.

For software implementation, the embodiments described herein may be implemented with separate software modules, such as procedures and functions, each of which performs one or more of the functions and operations described herein. The software codes can be implemented with a software application written in any suitable programming language and may be stored in memory such as the memory 60, and executed by a controller or processor, such as the controller 70.

Figure 2:
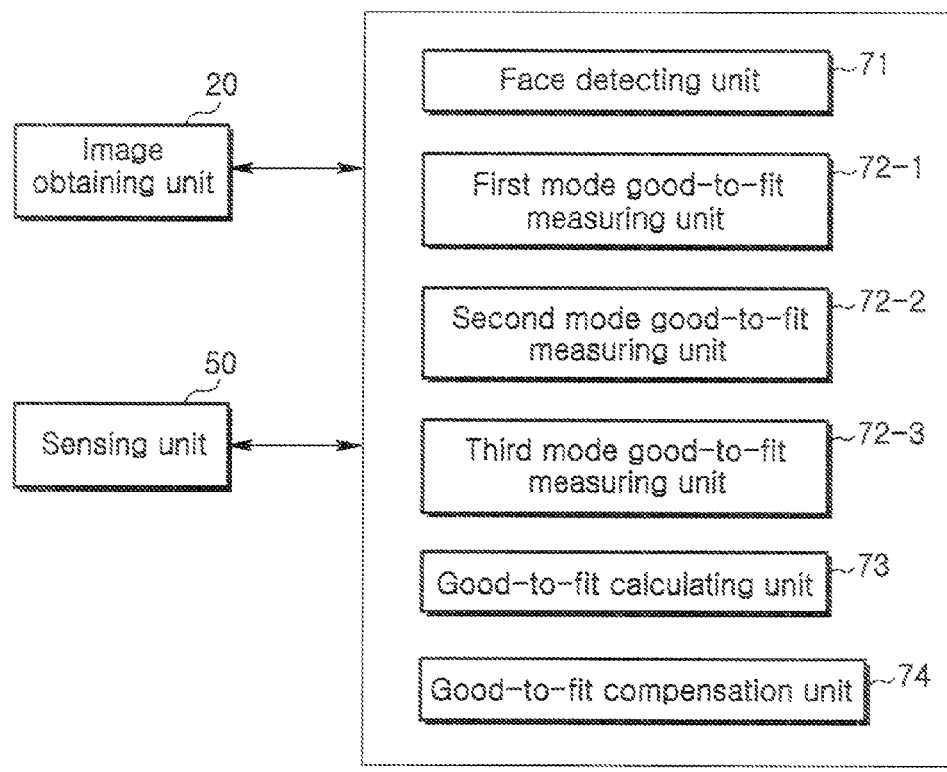
FIG. 2 is a detailed block diagram of a good-to-fit measuring unit and a good-to-fit calculating unit, according to one embodiment of the present disclosure.

FIG. 2 is a detailed block diagram of a good-to-fit measuring unit and a good-to-fit calculating unit, according to one embodiment of the present disclosure. As shown in FIG. 2, the controller 70 according to the one embodiment of the present disclosure may include a face detecting unit 71 configured to detect a face of human, a good-to-fit measuring unit 72 for measuring the good-to-fit score of an image data for the each shot mode, a good-to-fit calculating unit 73 for calculating the good-to-fit score of the image data for the each shot mode, and a good-to-fit compensation unit 74.

A digital preview image is obtained from a camera of the image obtaining unit 20 at 15 frames per second. The digital preview image is output or stored in a buffer. Each frame image of the digital preview image is measured (or processed) in a first mode good-to-fit measuring unit 72-1, a second mode good-to-fit measuring unit 72-2, and a third mode good-to-fit measuring unit 72-3, respectively. For example, the first mode good-to-fit measuring unit 72-1 measures (processes or determines) a good-to-fit score for a landscape mode based on a color, a contrast ratio, a value of illumination, and/or a quantity of light. The second mode good-to-fit measuring unit 72-2 measures (processes or determines) a good-to-fit score of a counterlight mode based on a color, a contrast ratio, a value of illumination, and/or a quantity of light. The third mode good-to-fit measuring unit 72-3 measures (processes or determines) a good-to-fit score of a night shot mode based on a color, a contrast ratio, a value of illumination, and/or a quantity of light. The number of respective mode good-to-fit measuring unit that may be used or included is not limited. A number of the respective mode good-to-fit measuring units that may be installed may be equal to a number of the shot modes there are found in the image data processing program and/or in the image obtaining unit 20, though such is not required. Accordingly, the number of the respective mode good-to-fit measuring units may be different from the number of the shot modes. The measured (processed or determined) good-to-fit score is transmitted to the good-to-fit calculating unit 73. The measured (processed or determined) good-to-fit score is numeralized (quantified) in the good-to-fit calculating unit 73 per each shot mode.

In numeralizing (or quantifying) the measured good-to-fit score, the good-to-fit compensation unit 74 may be used in correcting the good-to-fit score in consideration with information from the GPS module 40, the sensing unit 50 and/or the face detecting unit 71. For, example, the face detecting unit 70 detects a face of a human subject in the image data from the camera. If the face exists in the image data, the good-to-fit compensation unit 74 informs this fact to the good-to-fit calculating unit 73. Then, the good-to-fit calculating unit 73 considers this fact in calculating or determining the good-to-fit score.

The GPS module 40 is able to detect that a current position of the portable electronic device 100 is located in the mountains. When so, the GPS module 40 informs this fact to the good-to-fit calculating unit 73. Then, the good-to-fit calculating unit 73 considers this fact in calculating the good-to-fit score for a landscape mode, for example.

On the other hand, if there are many shot modes, the optimum mode may be determined by a tree manner (or a tree structure) for improving processing speed. The tree manner is explained in the following description. Reference to the tree manner includes a determining or a processing that is hierarchical.

The good-to-fit score for the landscape mode is measured in the first mode good-to-fit measuring unit 72-1 on the image data obtained from the image obtaining unit 20. Then, The good-to-fit for the counterlight mode is measured in the second good-to-fit measuring unit 72-2 on the image data. If the obtained image is proper (e.g., optimal or numerically a highest score) for the landscape mode and the counterlight mode, the landscape-counterlight mode is determined as the optimum shot mode. Namely, the optimum mode may be found in the tree manner.

Figure 3:
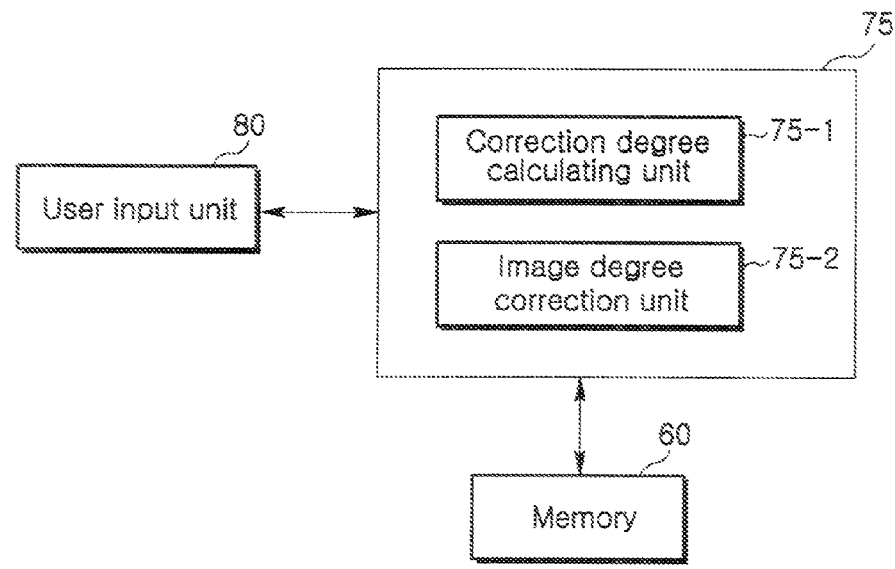
FIG. 3 is a detailed block diagram of an image correction unit, according to one embodiment of the present disclosure.

FIG. 3 is a detailed block diagram of an image correction unit, according to one embodiment of the present disclosure. As shown in FIG. 3, the image correction unit 75 may include a correction degree calculating unit 75-1 and an image degree correction unit 75-2. If the user issues commands to capture the image data to the image obtaining unit 20, a capture image is created. In this state, the user may correct the capture image by using the user input unit 80. The user may select a correction degree of any one of a strong correction degree, a medium correction degree and a weak correction degree through the user input unit 80. Accordingly, the correction degree calculating unit 75-1 determines a correction degree to be applied on the capture image data. Then, the image degree correction unit 75-2 corrects the capture image data according to a signal outputted from the correction degree calculating unit 75-1 corresponding to the strong, medium, and weak correction degrees. For example, the medium correction degree is correction in a range of 0-100. If the user select the strong correction degree, the range may be changed to 50-150. On the other hand, if the user selects the weak correction degree, the range is changed to 0-50. The degree of the correction may be adjusted flexibly, in addition to the fixed ranges. The quality of the corrected image may be quantified to be displayed. This manner of determining a correction degree and applying the correction degree may be applied in the stored image. In the following description, the quantification of the image data's quality may be explained with referring to FIG. 4.

FIG. 4 is a detailed block diagram of an image quality evaluation unit, according to one embodiment of the present disclosure. As shown in FIG. 4, the image quality evaluation unit 76 may comprise a character extracting unit 76-1, a character calculating unit 76-2, and an image determination unit 76-3. The image data obtained by the image obtaining unit 20 is created as the capture image through the user command. The character extracting unit 76-1 extracts the character of the capture image such as shaking, ultra low luminance, ultra high luminance, impurity, and mist. The character calculating unit 76-2 quantifies the quality of the image by calculating the characters. The image determination unit 76-3 has a function of informing the user of the quality of the image. The user sets up a reference value of factors, such as a degree of shaking, ultra low luminance, ultra high luminance, impurity, and/or mist. The controller 70 compares the reference value and a specific value of the image data with respect to the factors. Next, the controller determines that the quality of the image data is low if the specific value of the factors of the image data is lower than the reference value. For example, a vibration module to reduce the shaking is activated if the specific value of the shaking exceeds the reference value, or the sound output module is activated to output a sound that indicates that the specific value of the shaking exceeds the reference value.

On the other hand, the equations, which may be applied in the good-to-fit measuring unit 72 and the good-to-fit calculating unit 73, are referred to in FIG. 5 and FIG. 6. FIG. 5 shows an equation for obtaining good-to-fit for each shot mode on the image data, according to one embodiment of the present disclosure, and FIG. 6 shows an equation for obtaining a normalized point on the good-to-fit for each shot mode on the image data, according to one embodiment of the present disclosure. The equation shown in FIG. 5 is applied in the good-to-fit measuring unit 72. The good-to-fit measuring unit 72 includes the plurality of the mode good-to-fit measuring unit. The each mode good-to-fit measuring unit has its own constants.

In the equation shown in FIG. 5, fn(x) refers to a function for measuring the good-to-fit of nth mode. Namely, 1 is for $1^{st}$ mode good-to-fit measuring unit, and 2 is for $2^{nd}$ mode good-to-fit measuring unit. Here, x refers to a vector function extracted from the preview image. The support vector machine (SVM) learns or obtains as many vector functions as the number of the modes. The result of the learning (or obtaining) by the support vector machine, N support vector xsv, the binary label y (1 or −1), and a constant for each support may be obtained. Furthermore, another constant b for each mode may be obtained. K is a kennel function such as an RBF (Radial Basis Function), a Polynomial function and a Perceptron function.

FIG. 6 shows an equation for obtaining a normalized point on the good-to-fit for each shot mode on the image data, according to one embodiment of the present disclosure. Upsilon and beta in FIG. 6 are previously obtained values from the experiment with SVM learn. Gamma is a correction value obtained from the good-to-fit compensation unit 74. For example, if the face detecting unit 71 detects a face in the image data, the good-to-fit compensation unit 74 decides the value of gamma. The value of gamma obtained from the face detecting unit 71, the sensing unit 50, and the GPS module 40 contributes to the good-to-fit score. The good-to-fit score is in the range of 0-100 by the equation of FIG. 6. The good-to-fit score may be displayed as a number or as a bar on the display unit. The number of good-to-fit calculating unit 74 may be equal to the number of the shot modes, but such is not required. In FIG. 6, GOOD-TO-FIT 1, GOOD-TO-FIT 2, and good-to-fit 3 refers to the GOOD-TO-FIT scores of each shot mode, respectively.

In the above description, the good-to-fit measuring unit 72 and the good-to-fit calculating unit 74 is equal to the number of shot mode. However, a single good-to-fit measuring unit and a single calculating unit for all of the shot modes may be available with mandatory input elements. That is, the number of good-to-fit measuring units and the good-to-fit calculating units need not be is equal to the number of shot modes.

In the following description, the method for processing the image data is explained, referring to FIG. 7. FIG. 7 is a flow chart of the method for processing image data, according to one embodiment of the present disclosure. The shot mode may include a twilight mode, a café mode, a counterlight mode, a counterlight figure mode, a landscape mode, a snow landscape mode, and a sport mode. Here, the image obtaining unit 20 obtains the image data (preliminary data) (S1).

The good-to-fit measuring unit 71 measures the good-to-fit for each shot mode on the obtained image data (S2). When the image data is measured, the information from the face detecting unit 71, the sensing unit 50 and the GPS module 40 may be used, and given more weight. For example, if it is determined that the image data includes a face of the human, the figure mode may get additional points. Alternatively, if it is determined that the current position of the portable electronic device is located in the mountains by the GPS module 40, the landscape mode may get the additional points.

The controller 70 compares the good-to-fit for each mode to select the optimum shot mode (S3, S4). The good-to-fit point and the icon of the optimum shot mode are displayed with the preview image data (S5). In another embodiment of the present disclosure, the user may manually change the shot mode by using the user input unit 80. In a state in which the shot mode is determined by a selection of the user, the user can take a shot on the preview image to generate the capture image (S6). That is, by a command, the user may obtain the capture image from the preview image that is being buffered in a memory.

The user may correct the captured image data of the capture image. Namely, the correction is made by displaying the shot mode icon and selecting the shot mode icon (S7, S8). After the correction, the captured image data is stored in the memory by a user's selection. Alternatively, the captured image data may be stored in the memory without correction.

Alternatively, the above-described process may be applied on a portion of the image data, which may be relatively more important, for example, instead of an entire image data. For example, the controller 70 generates a portion image including a face of the human by recognizing the face portion of the image data through the face detecting unit 71. Then, the good-to-fit for the portion of the image may be further displayed. If the shot mode icon for the portion of the image data is selected, the image correction unit 75 of the controller 70 processes correction on the portion of image data. Or, the other image data except for the portion image data may be processed.

In the following description, the implementations of the present disclosure where the portable electronic device applies the method for processing image data according to the present disclosure will be explained with image diagrams as follow.

Figure 8:
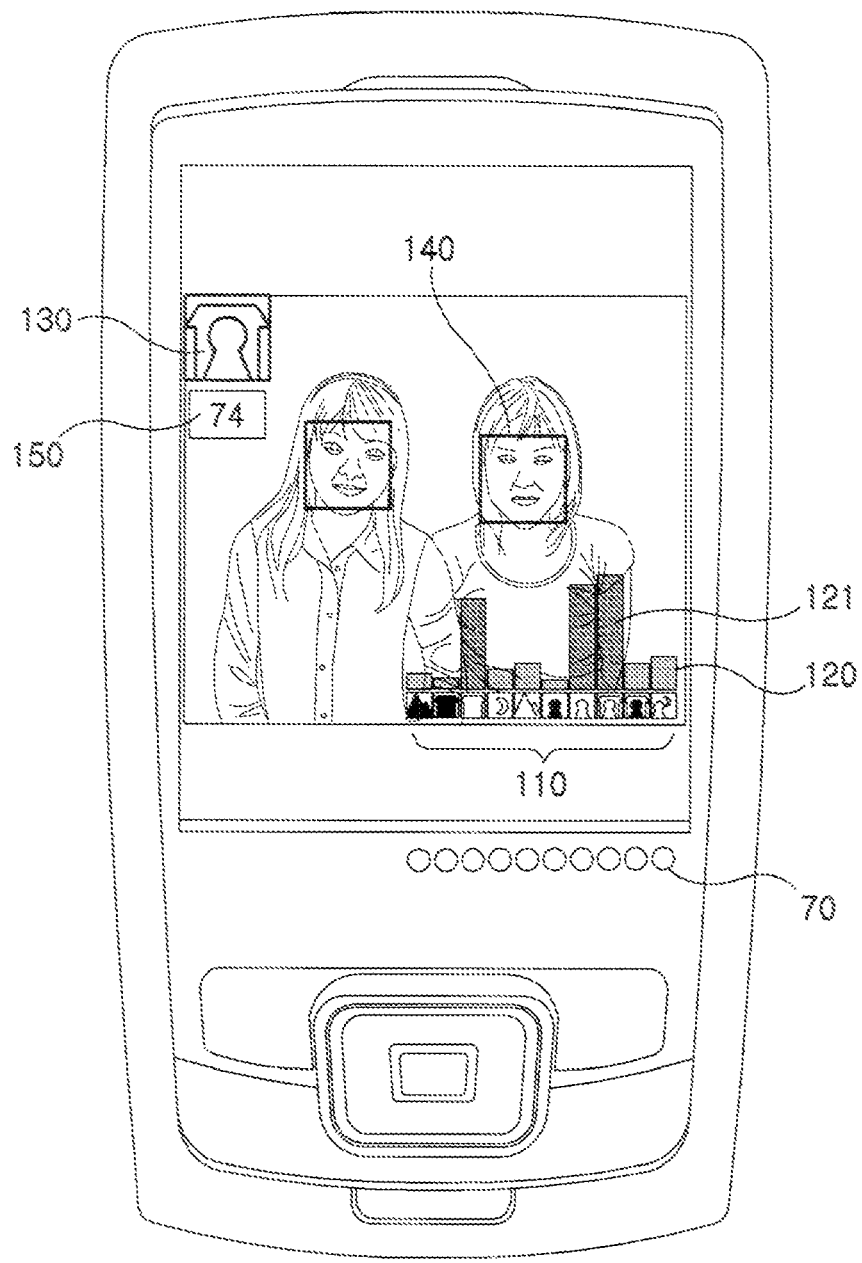
FIG. 8 illustrates a first implementation where the method for processing image data is applied, according to the one embodiment of the present disclosure.
Figure 9:
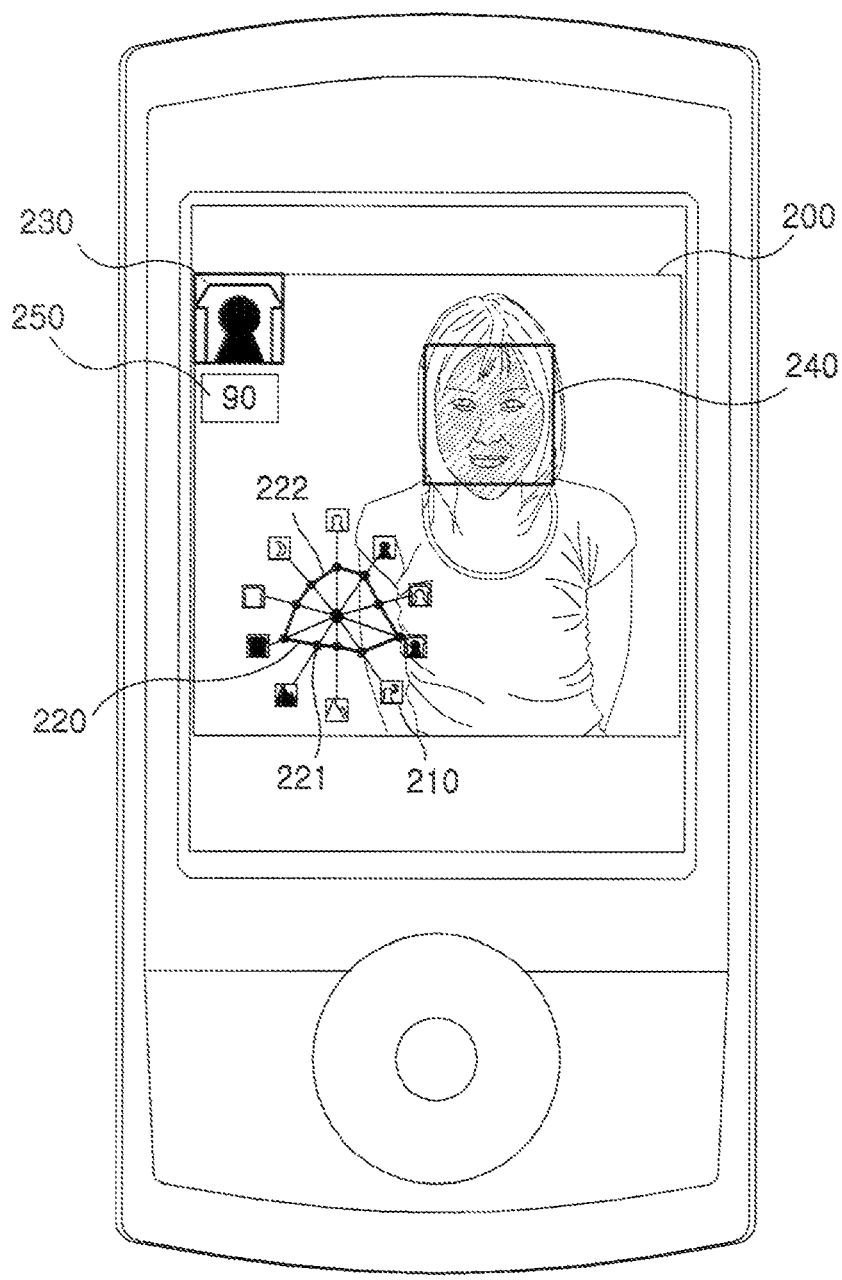
FIG. 9 illustrates a second implementation where the method for processing image data is applied, according to the one embodiment of the present disclosure.
Figure 10:
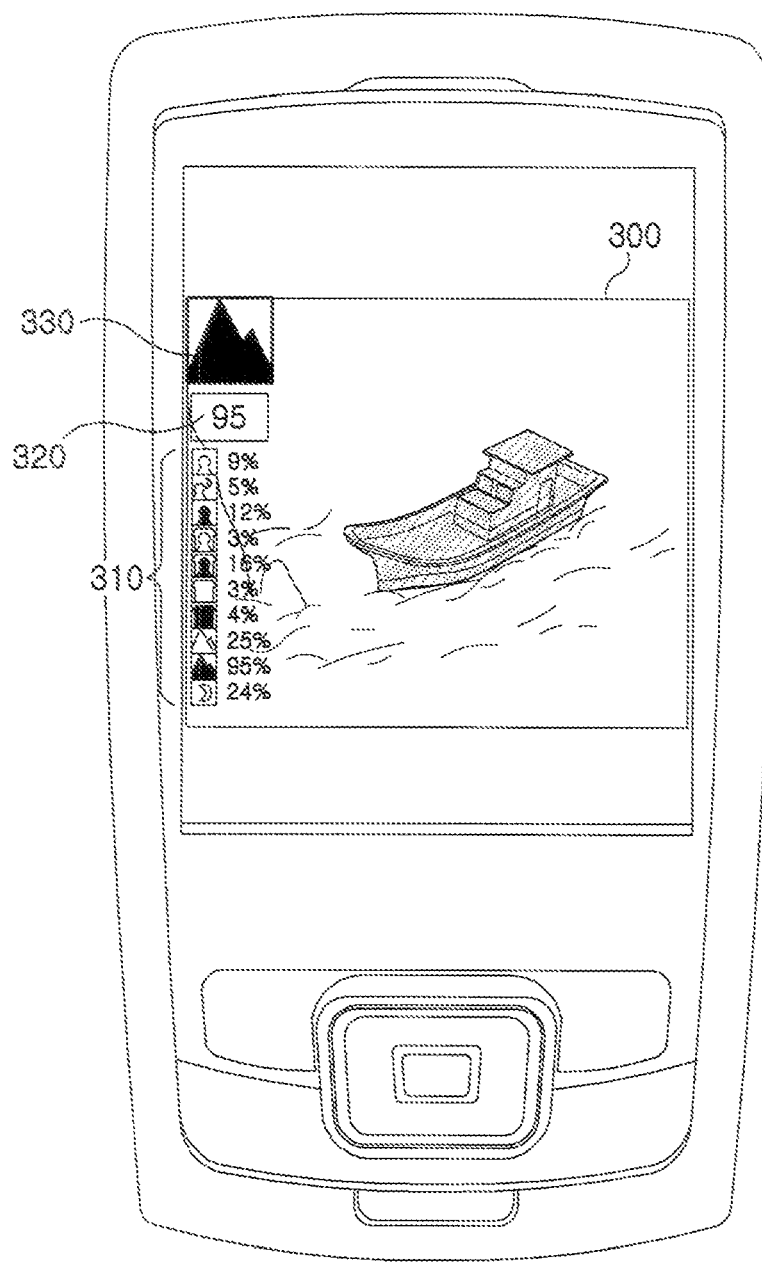
FIG. 10 illustrates a third implementation where the method for processing image data is applied, according to the one embodiment of the present disclosure.
Figure 11:
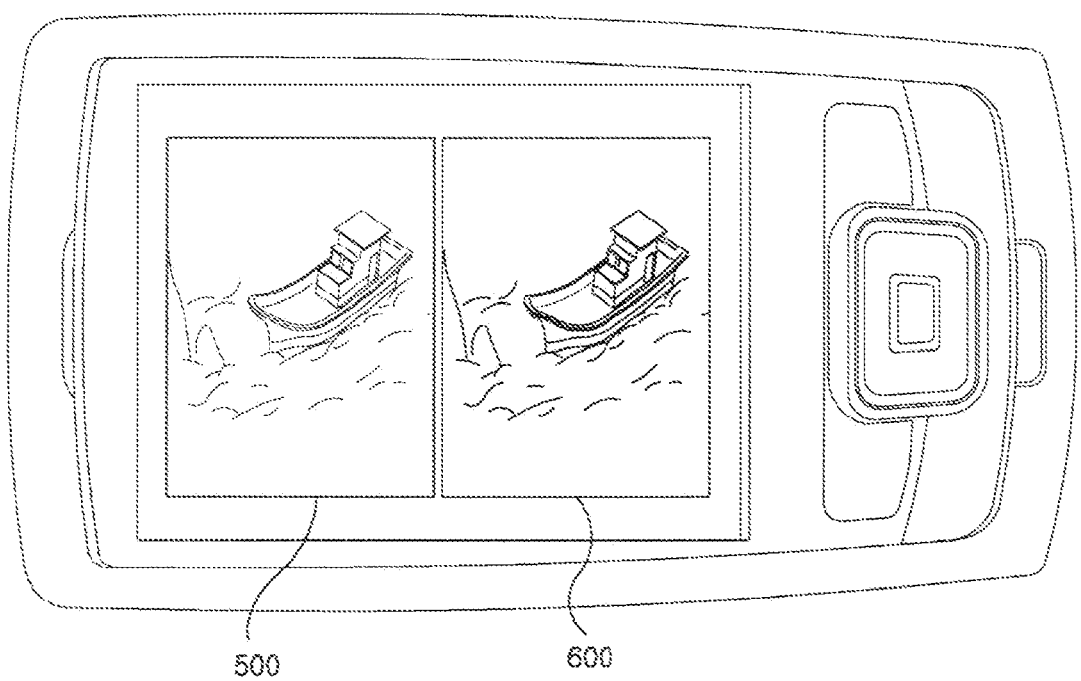
FIG. 11 illustrates a fourth implementation where the method for processing image data is applied, according to the one embodiment of the present disclosure.

FIG. 8 illustrates a first implementation where the method for processing image data is applied, according to one embodiment of the present disclosure, FIG. 9 illustrates a second implementation where the method for processing image data is applied, according to one embodiment of the present disclosure, and FIG. 10 illustrates a third implementation where the method for processing image data is applied, according to one embodiment of the present disclosure and FIG. 11 illustrates a fourth implementation where the method for processing image data is applied, according to one embodiment of the present disclosure.

As shown in FIG. 8, the portable electronic device may include a display unit 10 and a user input unit 70. The preview image data (of two people) obtained from the image obtaining unit 20 is displayed on the display unit 10. At this time, each shot mode icon 110 is sequencely disposed on a lower portion of the display unit 10. The bars 120 are displayed for each shot mode icon 110. The length of each of the bars references the good-to-fit of the image data for each of the corresponding shot modes. Further, colors of the bars represent degrees of the correction on the image data. Namely, when a picture is taken in each shot mode, the controller calculates how much the image would be corrected, measures the correction for each shot mode, and displays the degree of the correction in the color of the bar. For example, the red can refer to the strong correction, the yellow can refer to the medium correction, and the green can refer to the weak correction. Therefore, the user may confirm the degree of the correction according to the shot mode in preview state. Other colors or grayscales may be used, for example to represent the degree of correction.

In FIG. 8, the good-to-fit of the figure mode 130 is the best, which is shown by the icon. The controller 70 processes the image data in the figure mode 130 and displayed the processed image data on the display unit 10. The current shot mode icon is displayed on the left-upper portion to inform that the image data is processed by the indoor figure mode. At this time, if the user selects a shot mode icon that he wants, the preview image data is processed with the shot mode that he/she wants. In this state, the user may generate the captured image data by progressing the shot through the user input unit 80.

Next, the stored image data may be generated by the user's selection. At this time, the point of the quality 150 on the captured image data or the stored image data may be calculated to be displayed. The point of the quality is explained in FIG. 4. The additional explanation will be omitted for briefness. On the other hand, the each shot mode icon and the good-to-fit for the each shot mode may be displayed together. In that case, the user may progress the correction on the captured image data or the stored image data by simply selecting the shot mode icon. On the other hand, a frame 140 informs the user that the face of the human is detected. Therefore, the figure mode has a priority (or is given greater points) in this implementation of FIG. 8.

On the other hand, the frame 140 may refer to a portion of the image data. The portion of the image data designated by the frame 140 may be applied in the first implementation. Namely, the shot mode icon for the face portion (or frame) 140 may be further displayed. In that case, the portion of the image data may be corrected by selecting the shot mode icon for the face. Alternatively, if the one shot mode icon is selected, the background portion except for face portion may be corrected by the selected shot mode. At this time, the degree of the correction may also be adjusted (or indicated) by the bar. On the other hand, the display of the good-to-fit score may be processed in toggle. That is, the display of the good-to-fit score need not be at once. Rather, the various good-to-fit scores and the corresponding shot modes may be displayed sequentially, either automatically or by selection of the user. The image data in the respective shot modes may accompany the sequential display of the respective shot modes.

FIG. 9 illustrates a second implementation where the method for processing image data is applied, according to an embodiment of the present disclosure. As shown in FIG. 9, the preview image data 200 obtained from the image obtaining unit 20 is displayed on the display unit 10. At this time, the each shot mode icon stored in the memory 60 is disposed in a circle type graph on the display unit 10. The points representing the good-to-fit are disposed inside of the circle. The point is connected each other to form a line. Here, the indoor figure flash mode 221 is the best mode with the highest good-to-fit score. The controller 70 processes the image data with indoor figure flash mode to display the processed image data on the display unit 10. The flash is activated when the shot is made.

The icon for a current shot mode, which is the indoor figure shot mode 230, is displayed on the left-upper portion to inform that the current image data is processed with indoor figure flash mode. At this point, the user input unit 70 may be a rotary type input unit. The rotary type input unit corresponds to the icons disposed in the circle. If the user selects a icon that he/she wants with rotary input unit, the captured image is generated to be processed with the corresponding shot mode. Then, the stored image data may be generated from the captured image data.

In a state that the captured image data or the stored image data is read, the shot mode icon may be displayed together, and the simple correction may be made by selecting the displayed icon. The explanation of the correction process will be omitted because it is the same as that of the first implementation shown in FIG. 9. In embodiments of the present disclosure, the icon for a current shot mode and the corresponding good-to-fit score need not be displayed in the left-upper portion of the display 10, but may be displayed at any position.

In FIG. 9, the frame 240 references a face that is detected by the face detecting unit. Therefore, in the second implementation of FIG. 9, the figure mode has a priority.

FIG. 10 illustrates a third implementation where the method for processing image data is applied, according to the one embodiment of the present disclosure. As shown in FIG. 10, the image data 300 obtained from the image obtaining unit 20 is displayed on the display unit 10. At this time, the shot mode icons stored in the memory 60 is disposed on the left end of display unit in sequence. The good-to-fit for each shot mode is quantified to be displayed at one side of the each icon. Here, the counterlight landscape mode is the best shot mode. The controller 70 processes the image data with the counterlight landscape mode and displays the processed image data on the display unit 10.

The current shot mode icon 330 is displayed on the left-upper portion for informing that the image data is processed with the counterlight landscape mode. At this time, the user input unit may be any one of the side key, a rotary input unit and a navigation key. If the user selects the one icon that he/she wants through the user input unit 80, the captured image data is generated with the shot mode, and then, the stored image data is generated. In a state that the captured image data or the stored image data is read, the shot mode icon is displayed together. The simple correction may be processed on the captured image data or the stored image data by selecting the shot mode. The process of the correction is the same as that of first implementation. The explanation on that will be omitted for briefness.

On the other hand, there is no sign or frame that the face of the human is detected by the face detecting unit. Therefore, in the third implementation, the figure mode does not have a priority, unlike those of FIGS. 8 and 9.

In the following description, the corrected image data is displayed with the original image data. We will explain this with referring to FIG. 11.

FIG. 11 illustrates a fourth implementation where the method for processing image data is applied, according to the one embodiment of the present disclosure. In FIG. 11, the screen is divided into two portions so that the pre-corrected image data and the post corrected image data could be displayed on each half screen. According to the aforementioned implementations, the image data may be corrected simply.

According to the fourth implementation, the user may see the pre-corrected image data and the post-corrected image data at the same time. The user may confirm or review the degree of the correction. Furthermore, the fading effect may be applied in this implementation. In embodiments of the present disclosure, the number of post-corrected image data that is displayed may be more than two, and may be accompanied by their respective good-to-fit scores.

According to another implementation, the accumulated data may be obtained. The accumulated data is generated by the optimum shot mode by comparing the plurality of the shot modes, and the shot mode by the user selection. The accumulated data is used for generating the learning correction data. The good-to-fit may be calculated in consideration with the learning correction data. Namely, the shot mode that the user has selected is accumulated. This is considered in calculating a good-to-fit score. The better shot mode may be provided to the user.

As aforementioned, the portable electronic device having the good-to-fit scores is not limited to the constitution and method of the embodiments. It should be understood that the person in the art may easily modify and alter the present disclosure by selectively combining the entire or part of the each embodiment.

What is claimed is:

1. A method for processing image data in a portable electronic device, the method comprising:
    obtaining an image by an image obtaining unit of the portable electronic device having a plurality of shot modes;
    determining each good-to-fit score of the plurality of shot modes for the image;
    determining each degree of correction for the plurality of the shot modes for the image;
    displaying the each good-to-fit score and the each degree of correction of the plurality of shot modes on the image; and
    displaying a first icon representing a shot mode of the plurality of the shot modes in which the image is currently processed.

2. The method of claim 1, wherein, the determining of the each good-to-fit score comprises:
    calculating the each good-to-fit score for the plurality of shot modes by an image data good-to-fit unit.

3. The method of claim 1, wherein the determining of the each good-to-fit score comprises:
    calculating the each good-to-fit score for the plurality of shot modes in consideration of a human face when the human face is detected from the image.

4. The method of claim 1, wherein, the displaying of the each good-to-fit score and the each degree of correction comprises:
    displaying a second icon representing each shot mode of the plurality of shot modes;
    displaying a bar representing a good-to-fit score of the each degree of correction for the each shot mode.

5. The method of claim 1, wherein the displaying of the each good-to-fit score and the each degree of correction comprises:
    determining an optimum shot mode from among the plurality of shot modes by comparing all good-to-fit scores and selecting one of the plurality of shot modes with a highest good-to-fit score; and
    displaying the image processed in the optimum shot mode.

6. The method of claim 4, wherein the displaying of the each good-to-fit score and the each degree of correction comprises:
    selecting any one of the plurality of shot modes through a user input unit; and
    displaying the image processed based on the selected shot mode.

7. The method of claim 6, further comprising:
    determining a shot mode having an optimum good-to-fit score by comparing all good-to-fit scores of the plurality of shot modes and selecting one of the plurality of shot modes with a highest good-to-fit score as the optimum good-to-fit score; and
    generating a learning correction data by accumulating data on the selected one shot mode selected via the user input unit and the determined shot mode having the optimum good-to-fit score, wherein the determining of the each good-to-fit score comprises:
    measuring the each good-to-fit score in consideration of the learning correction data.

8. The method of claim 6, further comprising:
    storing the image processed based on the selected shot mode.

9. The method of claim 1, further comprising:
    determining an optimum shot mode from among the plurality of shot modes by comparing all good-to-fit scores;
    generating a capture image by photographing in the optimum shot mode;
    measuring a quality of data of the capture image; and
    displaying a score of the quality of data of the capture image.

10. The method of claim 1, further comprising:
    generating a stored image by storing the image;
    generating a corrected image by correcting the stored image through at least one of the plurality of shot modes; and
    displaying the stored image and the corrected image together.

11. A portable electronic device comprising:
    an image obtaining unit configured to obtain an image data of an image;
    a display unit displays configured to display the obtained image; and
    a controller configured to:
    determine each good-to-fit score of a plurality of shot modes for the image;
    determine each degree of correction for the plurality of the shot modes for the image;
    control the display unit to display the each good-to-fit score and the each degree of correction of the plurality of the shot modes on the image; and
    control the display unit to display an icon representing a shot mode of the plurality of the shot modes in which the image is currently processed.

12. The portable electronic device of claim 11, further comprising:
    a face detecting unit which detects a face of a human subject, wherein the controller is further configured to determine the each good-to-fit score for the plurality of shot modes in consideration of a face detection information received from the face detecting unit.

13. The portable electronic device of claim 11, wherein the controller further comprises a good-to-fit calculating unit which calculates the each good-to-fit score.

14. The portable electronic device of claim 11, further comprising:
    a user input unit configured to select at least one of the plurality of shot modes, wherein, the controller processes the image according to a shot mode selection signal input from the user input unit to display the image.

15. The portable electronic device of claim 11, further comprising:
- a GPS module configured to measure a current position of the portable electronic device; and
- a memory configured to store a map data,
- wherein the controller is further configured to
- obtain a current position information by using the current position and the map data, and
- determine the each good-to-fit score of the plurality of shot modes in consideration with the current position information.

16. The portable electronic device of claim 14, wherein the user input unit includes a rotary type input unit.

17. The portable electronic device of claim 12, wherein the controller is further configured to generate a portion image about a center of the face included in the image by using the face detecting unit, and control the display unit to display the each good-to-fit score by determining the each good-to-fit of the plurality of shot modes in consideration of the portion image.

* * * * *